May 25, 1965
M. B. ORR
3,185,193
HACKSAW BLADE HOLDER
Filed Feb. 12, 1964
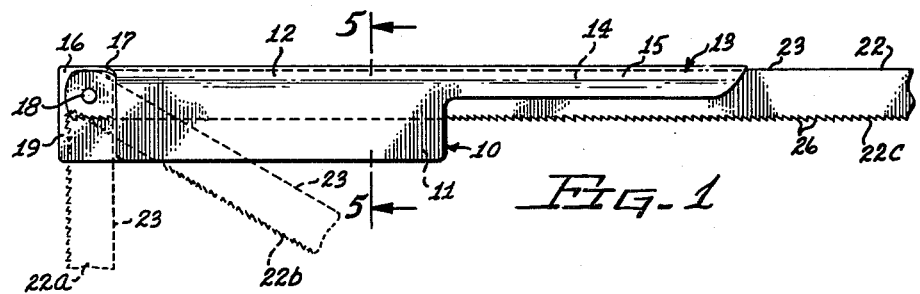
Fig-3  Fig-4
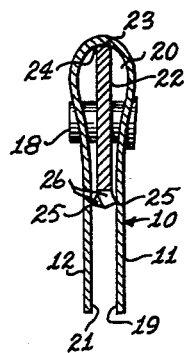
Fig-5
INVENTOR.
MARION B. ORR
BY
Willard S. Grow
ATTORNEY

3,185,193
HACKSAW BLADE HOLDER
Marion B. Orr, 257 W. 9th Place S., Mesa, Ariz.
Filed Feb. 12, 1964, Ser. No. 344,391
2 Claims. (Cl. 145—31)

This invention relates to hand tools and is particularly directed to an improved hacksaw blade holder.

One of the objects of this invention is to provide a hand tool for holding a tooth bar or hacksaw blade together with means for detachably holding the same including a suitable handle.

Another object of this invention is to provide a hand saw tool which can use an ordinary hacksaw blade to provide a cutting edge.

Yet another object is to provide an improved hacksaw blade holder which can support the blade to reach into a small hole while the hacksaw blade is rigidly supported throughout substantially the entire cutting length thereof.

It is also an object of this invention to provide a holder adapted to receive a standard sawblade of the hacksaw or a similar type and to demountably hold the same in such a manner that the teeth of the blade provide the sole means for securing the holder in operative position with the saw blade.

Further features and advantages of this invention will appear from a detailed description of the drawings in which:

FIG. 1 is a side elevation of a hacksaw blade holder incorporating the features of this invention.

FIG. 2 is a plan view of the device shown in FIG. 1.

FIG. 3 is a rear end elevation of the device of FIG. 1.

FIG. 4 is a front end elevation of the device of FIG. 1.

FIG. 5 is an enlarged sectional view on the line 5—5 of FIG. 1.

As an example of one embodiment of this invention there is shown a hacksaw blade holder which is formed from a single flat sheet of suitable material into a narrow substantially U-shaped piece consisting of the handle part 10 having the side portions 11 and 12 and the integral outer blade support part 13 having the side portions 14 and 15.

The side portion 12 is cut away at 16 and 17 at the rear end of the handle 10. A pivot pin 18 is rigidly formed on the inner surface 19 of the handle part side portion 11 and projects laterally across the slot 20 formed by the inner surface 19 of the side portion 11 and the inner surface 21 of the side portion 12.

To load a sawblade 22 into the holder, one end of the blade is placed with its hole over the pivot pin 18 and extending downward as shown at 22a in FIG. 1. The blade 22 is then swung around the pivot pin 18 to position 22b causing its back edge 23 to initially enter between the inner surfaces 19 and 21 of the side portions 11 and 12 of the handle part 10. Final swinging of the blade 22 to operative position 22c causes the back edge 23 to abut against the surface 24 at the juncture of the surfaces 19 and 21 for backing up the blade during use. At the same time the side points 25 of the hacksaw blade teeth 26 go between the surfaces 19 and 21 and spread the side portions 11 and 12 to yieldingly hold the surfaces 19 and 21 in firm contact with the teeth side points 25 which bite into the surfaces 19 and 21 to normally formally hold the saw-blade in operative position 22c.

The removal of the blade from the handle may be accomplished by forceably swinging the blade from the operative position 22c back through position 22b to the removal and loading position 22a. It is to be noted that the engagement and digging in of the side points 25 of the blade teeth 26 with the inner surfaces 19 and 21 provide the sole means for demountably securing the blade in operative position in the holder.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A handle for use with a hacksaw blade having:
   (a) cutting teeth along one edge of the blade,
   (b) a back edge opposite said cutting teeth,
   (c) and a mounting hole in each end thereof,
   (d) a manipulating handle adapted to be attached to said hacksaw blade including,
   (e) a pair of laterally spaced side portions,
   (f) facing inner surfaces on said side portions adapted to yieldingly engage side points on said cutting teeth to retain said blade in operative position in said handle,
   (g) a loading and unloading cut-away slot formed in one of said side portions at the rear of said handle,
   (h) and a pivot pin fixed to the other of said side portions and extending laterally in said slot adapted to receive a mounting hole in one end of said saw blade so that said saw blade may be swung about said pivot pin to and from operative position between said laterally spaced side portions of said handle whereby engagement of the side points of said teeth between the facing inner surfaces of said side portions provides the sole means for securing said saw blade in operative position in said handle.

2. A handle for use with a hacksaw blade having:
   (a) cutting teeth along one edge of the blade,
   (b) a back edge opposite said cutting teeth,
   (c) and a mounting hole in each end thereof,
   (d) a manipulating handle adapted to be attached to said hacksaw blade including,
   (e) a pair of laterally spaced side portions,
   (f) facing inner surfaces on said side portions adapted to yieldingly engage side points on said cutting teeth to retain said blade in operative position in said handle,
   (g) a loading and unloading cut-away slot formed in one of said side portions at the rear of said handle,
   (h) a pivot pin fixed to the other of said side portions and extending laterally in said slot adapted to receive a mounting hole in one end of said saw blade so that said saw blade may be swung about said pivot pin to and from operative position between said laterally spaced side portions of said handle whereby engagement of the side points of said teeth between the facing inner surfaces of said side portions provides the sole means for securing said saw blade in operative position in said handle,
   (i) and an outer support part formed integral with the front of said handle part and adapted to engage the back edge of the sawblade when in operative position in said handle.

References Cited by the Examiner
UNITED STATES PATENTS
| | | |
|---|---|---|
| 1,726,241 | 8/29 | Schubert. |
| 1,975,784 | 9/32 | Walker _____ 30—155 X |

FOREIGN PATENTS
| | | |
|---|---|---|
| 161,849 | 4/21 | Great Britain. |
| 124,869 | 5/49 | Switzerland. |

WILLIAM FELDMAN, *Primary Examiner.*

MILTON S. MEHR, *Examiner.*